Patented Apr. 1, 1930

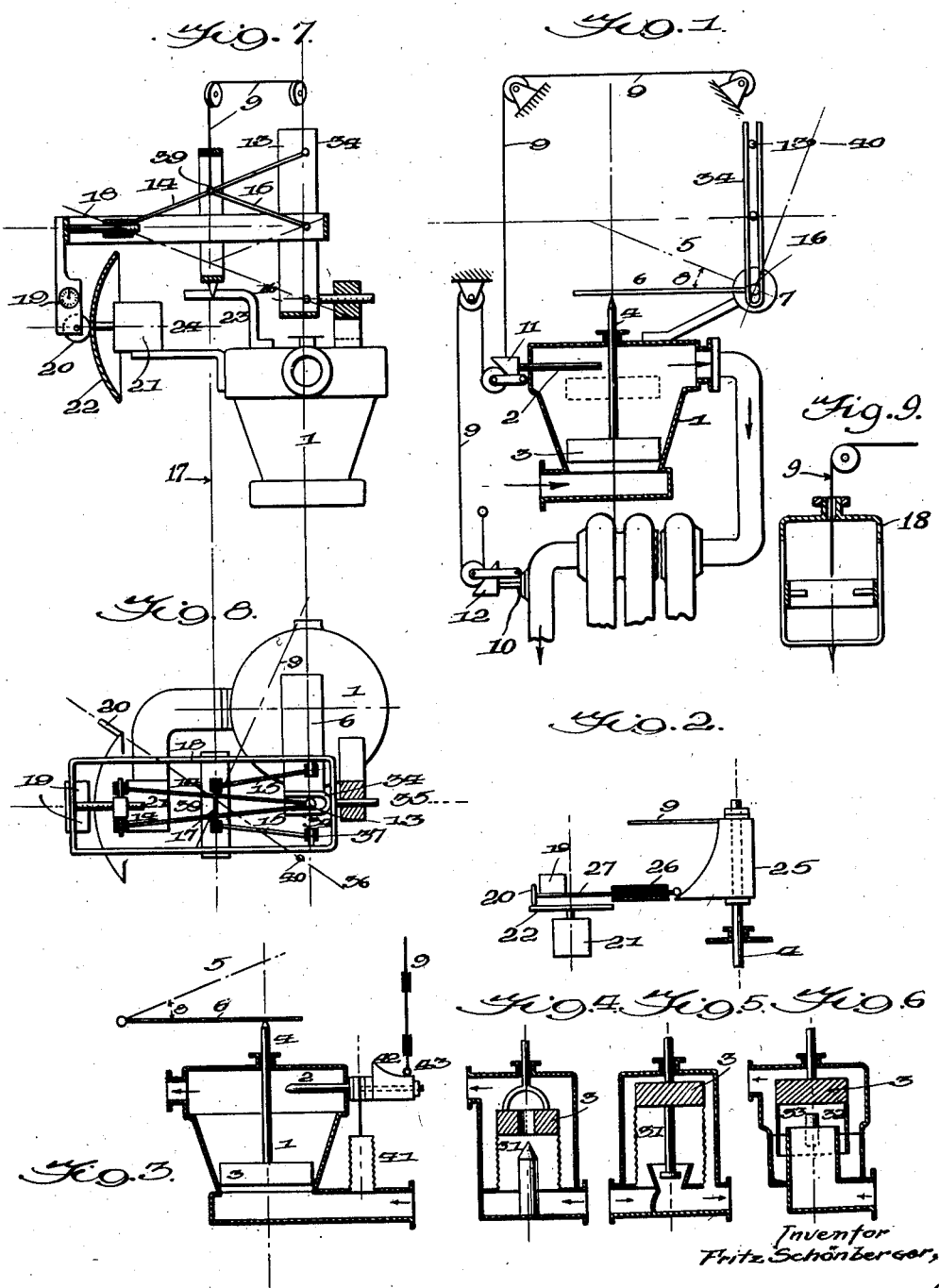

1,752,855

UNITED STATES PATENT OFFICE

FRITZ SCHÖNBERGER, OF STERKRADE, GERMANY

APPARATUS FOR MEASURING PHYSICAL CHARACTERISTICS OF FLOWING STREAMS OF FLUID

Application filed April 4, 1927, Serial No. 180,973, and in Germany February 25, 1924.

The present invention relates to an improved apparatus for exactly measuring fluid currents, and it is based upon exact physical relations and therefore not subject to any limitations.

The accompanying drawing illustrates diagrammatically by way of example how the invention can be put into practice: Fig. 1 is a vertical section through a preferred constructional form of the improved apparatus, Fig. 2 is a modification thereof, Fig. 3 is a further modification thereof for use with gaseous matters, Figs. 4 to 6 show different constructional forms of a volume meter used in connection with the improved apparatus, Fig. 7 is a side view of the apparatus shown in Fig. 1, while Fig. 8 is a plan view of Fig. 7, and Fig. 9 is a side view partly in section of a detail of Fig. 7.

Referring to Figs. 1, 7, 8 and 9: In a volume meter 1 a heat responsive contrivance 2 is inserted. The stroke of the plunger 3 or of the plunger-rod 4 respectively indicates the volume of the fluid flowing through the meter per unit of time. If the natural ratio between plunger stroke and volume of fluid flowing through the meter is not as desired, it can be easily changed or transformed in a way known in the art. The upper end of the plunger-rod 4 acts upon a one-armed turning-lever 6, which from its zero position disposed at right angles to the plunger-rod and shown by full lines in Fig. 1 oscillates about its turning axis or fulcrum 7 into the dotted-line position 5 during its adjustment by the plunger-rod. The tangent of the oscillation-angle 8 is thus proportional to the volume of fluid flowing through the meter, that is, to the differential quotient of the volume to the time.
The turning-lever 6 is firmly connected with the slotted lever 34 which thus oscillates with the turning-lever about the fulcrum 7. In said slotted lever 34 a ball or cross-head 13 (hereinafter explained) moves up and down, so that it follows the oscillations of said lever.

9 is a cord that is operated directly by the heat responsive contrivance. In Fig. 1, two such contrivances—one, 2, in the fore-flow, and another one, 10, in the return-flow—are provided and so coupled by means of a system of pulleys that the stroke of the cord 9 indicates the temperature difference between fore-flow and return-flow. As this difference is usually not proportional to the strokes of the heat responsive contrivances, a transformer cam race is provided for each heat responsive contrivance to transmit motion therefrom to the pulleys in a way known in the art. The transformer cam races include the wedges 11 and 12 which are connected with the respective heat responsive devices 2 and 10 so as to be moved back and forth thereby and thus to move the respective pulleys to impart the proper stroke to the cord 9. The ball or cross-head 13 is guided in rectlinear direction between its end positions 13 and 16 by an ellipso-link 14 with counter-link 15. The adjustment of the cross-head 13 is made by the cord 9, so that the stroke of the cross-head indicates changes in temperature measurements. 18 designates a frame, which includes a horizontal frame member and a vertical frame member, turnable as a unit about a turning-axis 17, indicated by the dot and dash line. In Fig. 8, said frame is shown in its zero position 35 whence it is turnable into the position indicated by the dot and dash line at 36. Fig. 9 shows said frame in a sectional elevation at right angles to its position in Fig. 7. The whole ellipso-link is mounted in said frame 18 at 37 and 38 and can thus oscillate about the same turning-axis as the frame itself. The cross-head 13 of the ellipso-link is thus movable in two directions. The zero position 16 of the cross-head 13 lies at the fulcrum 7 of the turning-lever 5. The turning axis 17 of the frame 18 and the rectilinear guide 13—16 of the cross-head 13 are parallel to one another. The plane of said two parallel lines is the zero position 35 of the frame 18, said plane passing through the turning-axis 7. The cord 9, that is attached to the middle 39 of the link 14 and there coincides with the turning-axis 17, moves the cross-head 13 in the zero position of the slotted lever 34 up and down. Said slotted lever 34 causes the cross-head 13 of the ellipso-link to participate in its oscillations with the turning-lever 6 and thereby turns the ellipso-link 14 and thus the frame 18 beyond its zero position 35. The movement of said frame 18 is the resultant movement of the combined movements of the lever 34 and link 14 and represents the combined value of the measurements of volume and temperature. A counter 19 is attached to said frame 18 and adapted to be driven from a friction-wheel 20. A time clock 21 drives the other friction-wheel 22 and thus the counter 19. The friction-wheel 22 has a spherical surface of a radius issuing from the point of intersection 23 between the turning-axis 24 of the friction-wheel 22 and the turning axis 17 of the frame 18. Thus, the friction-wheel 20 during the turning of the frame 18 moves along the spherical contact surface of the friction-wheel 22 and is set by the latter in more or less rapid rotations according to its distance from the turning-axis 24 of the friction-wheel 22. The value sought for, that is, the quantity of heat in thermal units given off from the flowing stream of fluid between the fore-flow and the return-flow, can then be read-off as a number from the counter 19, as follows from the following consideration: The vertical distance of the cross-head 13 from its zero position 16, or from the turning-axis 7 respectively, corresponds to the difference of the temperatures in the fore-flow and in the return-flow. The tangent of the oscillation angle 8, or of the slotted lever 34 respectively, corresponds to the quantity or volume of fluid flowing through the meter per unit of time. A multiplication of said quantity by said temperature difference indicates then the number of thermal units. In the triangle 7—13—40 the distance 13—40 is always equal to the distance 7—13 multiplied by the tangent of the angle 13—7—40, that is, equal to said quantity of fluid per unit of time multiplied by said temperature difference. The distance 40—13 is, however, equal to the horizontal distance of the cross-head 13 from the zero position 35 of the ellipso-link or of the frame 18 in Fig. 8. Said distance is proportional to the distance of the contact point of the friction-wheels 20 and 22 from the same zero position 35, that is, also from the turning-axis 24 coinciding with said zero position. The friction-wheel pair integrates thus the momentary values of the thermal units flowing through the meter and therefore by the continued operation of the device the counter will show the sum of the total thermal units which have been given off from the flowing fluid between the fore-flow and the return-flow, that is, the value sought for.

By way of additional explanation, the following statement is made.

The frame 18 is shown in elevation in Figure 7, in another elevation in Figure 9 and in plan in Figure 8. This frame 18 is turnable only about the vertical axis 17. This turning axis is indicated as a dot and dash line in Figures 7 and 9 and as a point in Figure 8 (point of intersection of the cross of axes). The turning-lever 6 and the slotted lever 34 are rigidly connected with one another. They are therefore one single piece. Figure 1 shows it in side elevation. In Figure 7 the slotted lever 34 is shown in section through its center plane, so that only one web of the lever can be seen in the drawing. This web hides at the same time the turning-lever 6. In Figure 8 the whole lever is shown seen from above. The turning lever 6 is designed above the volume meter 1, perpendicular to the center line 35, with which in Figure 8 the fulcrum 7 of the lever coincides. The slotted lever is visible on both sides of the ball 13.

When the frame 18 and in conjunction therewith the ellipso-link deflects from the position 35 shown in Figure 8 into the position 36 (around the turning axis 17), the ball 13 of the ellipso link enters into the position 40 (Figures 8 and 1). The double lever 6—34 oscillates then about its fulcrum 7 into the dotted position 5 (Figure 1). This is possible, as the ball 13 can be shifted in the slot of the lever 34 parallel to the fulcrum 7, as can easily be taken from Figure 8. The ball 13 is guided on the sides by the slotted lever only between two surfaces, but is not held fast. The ball 13 can freely move to all other directions.

The slotted lever 34 is wide enough, as shown in Figures 8 and 7, so that the ball 13 may not jump out of the lateral guides of the slotted lever in the position 40 (Figure 8).

The pulling cord 9 transmits the deflection of the heat responsive device upon the ellipso-link 14 (Figure 7), to the end of which cord the ball 13 is secured. In this way the height of the position of the ball 13 is adjusted by means of the heat measuring contrivance.

Figure 2 shows a modification of the apparatus. On the plunger-rod 4 of the volume meter a cam body 25 is turnably mounted, the turning of the latter being adjusted by the cord 9 of the heat responsive contrivance. The cross-head 26 of the bar 27 slides upon the cam body 25 and is thereby adjusted. The bar 27 adjusts, like the frame 18 in the former example, the friction-gear 20, 22 with counter 19 driven from the time clock 21. The shape of the cam body 25 is so determined by calibration that the position of the cross-head 25 corresponds always to the combined value of the measurements of volume and temperature. For the adjustment of the cross-head 26 relatively to the cam body 25, shifting and turning movements of any combinations may be used, so that numerous constructional forms are possible.

The friction-gear 20, 22 can also be driven in any other way, for instance by means of a vane-wheel in connection with the volume meter. The shape of the friction-wheel as well as the adjustment of the same can be executed in various ways. Anyhow, shape and adjustment must be such that the actual effective ratio of transmission of the friction-gear corresponds to the physical and mathematical relations, which can always be determined or found by calibration. If required, also oscillations of the single measurements must be transformed corresponding to the physical and mathematical relations, as already mentioned above.

The plunger surface 3 must be considerably larger than the fully opened annular slot 28 or the connecting branches 29, 30. The ratio between the plunger surface and the measuring-slot surface becomes easily so large that the annular formation of the measuring-slot, due to its little breadth, is no longer possible. In this case, constructions such as illustrated in Figs. 4, 5 and 6 may be used, which allow the use of any appropriate diameter for the plunger 3. Figs. 4 and 5 show plungers 3 with flexible pipe closures 31 and Fig. 6 a plunger with a driving bell 33. In the latter construction, the measuring-slot 32 can also be disposed in the wall of the bell 33 and submerged in the sealed liquid, for instance mercury.

In almost all cases, the physical and mathematical relations result in the volume meter indicating no volumes but variable multiples thereof only, due to the kind of apparatus and to the nature of the fluid to be measured and which must be determined by calibration. With large measuring ranges said change of indication is possible only by making the load of the plunger 3 variable and adapting the same to the actual nature of the fluid to be measured. With heavy materials such as water, this can be effected in a simple way with the aid of the plunger buoyancy by giving to the plunger a fixed volume and a fixed specific weight. Both can always be determined by calibration. With light matters, particularly gases, volume and specific weight of the plunger are often such that they can not be executed in practice, while furthermore the change of the specific weight and thus of the buoyancy often follows unsuitable laws. In such cases the plunger load can be made variable in any other ways, which are manifold.

All said volume meters can, of course, also be used separately.

With gaseous matters, the nature of the gas is also dependent upon the pressure, so that also the pressure must be measured.

Fig. 3 shows such an apparatus for measuring the quantity of the gas flowing through the meter. A manometer 34 and a heat responsive contrivance 2 adjust the cam body 35 which again adjusts the cross-head 36 and thus the cord 9, the other construction being similar to that shown in Fig. 1. The quantity of the gas which has passed through the meter, can be read-off in kgs. from the counter 19.

As the invention is based on the fact of deriving the value sought for from independent single measurements, the measuring apparatus can also be used, as shown in Fig. 3, for measuring any other value determined by the nature of the material to be measured. Hence, it follows that, as a characteristic feature of the improved method on the contrary to known methods of similar kind, at least three independent values must be measured and that, furthermore, the meter is mounted on one single conduit only through which flows the fluid; it being, of course, possible to use the same also for two conduits as shown in Fig. 1.

What I claim is:

1. In a device for registering composite physical characteristics of flowing streams of fluid, the combination of means responsive to the rate of flow of the fluid, means responsive to the difference in temperature between the fore-flow and the return flow of the flowing stream of fluid, each of said responsive means including a member movable in accordance with the characteristic to which it is responsive, a third movable member, means connected with and actuated by the combined movements of the first two mentioned movable members to impart the resultant movement thereof to said third movable member, a friction drive member actuated at a constant rate of speed by means other than those for moving the aforementioned movable members, and a counter having a friction drive in co-operative relation with the friction drive member and movable thereover by the said third movable member to drive the counter at varying speeds in accordance with the resultant movements of the two first mentioned movable members whereby to register on the counter the total units of the desired characteristic.

2. In a device for registering composite physical characteristics of flowing streams of fluid, the combination of a meter having a plunger movable in accordance with the rate of flow of the fluid, a substantially upright oscillating arm, means actuated by the plunger for oscillating the arm, a temperature responsive device, a member movable by the temperature responsive device in accordance with changes in the temperature of the fluid, a frame mounted to oscillate about a vertical axis and including horizontal and upright members, link mechanism mounted upon the horizontal frame member and having a cross-head slidable upon the oscillating arm, the link mechanism being connected to and movable in accordance with the movement of the member moved by the temperature responsive device, a rotatable convex driving member, means independent of the other parts of the apparatus for driving the rotatable member, and a counter carried by the horizontal frame in frictional drive relation with the convex face of the drive member and movable thereover upon movement of said frame to vary the drive of the counter.

FRITZ SCHÖNBERGER.